UNITED STATES PATENT OFFICE.

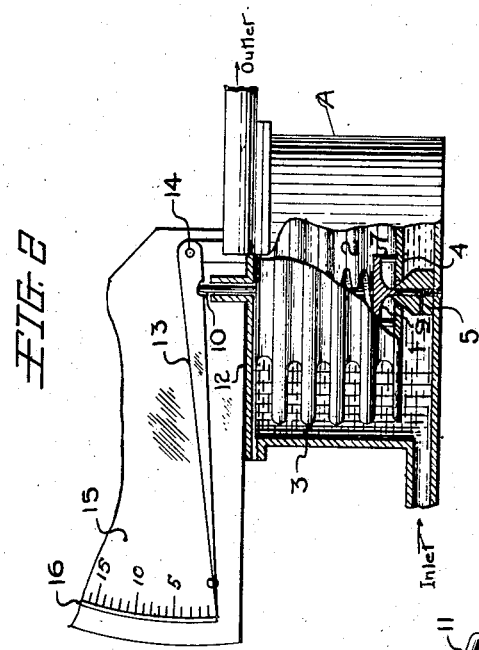
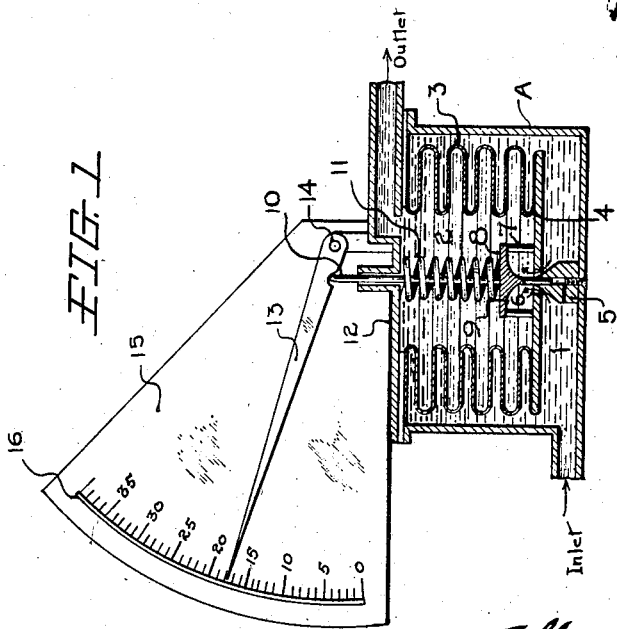
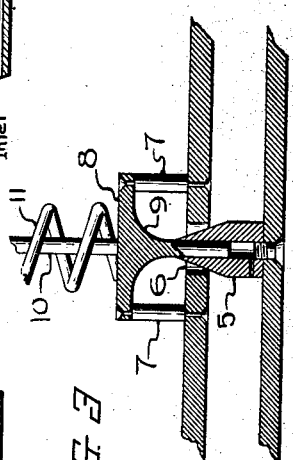

ALBERT R. LONG, OF BALLSTON, VIRGINIA, AND HAROLD H. TURNER, OF HEMPSTEAD, NEW YORK.

FLOW METER.

1,416,220.　　　　Specification of Letters Patent.　　Patented May 16, 1922.

Application filed March 6, 1920. Serial No. 363,767.

*To all whom it may concern:*

Be it known that we, ALBERT R. LONG and HAROLD H. TURNER, citizens of the United States of America, residing at Ballston, in the county of Alexandria, State of Virginia, and Hempstead, Nassau County, State of New York, respectively, have invented a certain new and useful Improvement in Flow Meters, of which the following is a specification.

This invention relates to an improvement in flow meters, and has particular reference to an instrument for measuring the rate of flow of a fluid.

One object of the invention is to provide an instrument which will give an accurate indication of the amount of liquid passing therethrough, indicating the amount in pounds per hour, gallons per hour, miles per gallon, or miles per pound.

Another object of the invention is the provision of means for showing the smallest flow of gasolene and the amount of fuel going to the motor at all speeds and at all times.

A further object of the invention is to provide a flow meter adapted to be operated by a fluid under varying pressures, which instrument will indicate steadily, faithfully and accurately the rate of flow of the fluid used.

In the art to which this invention relates it is well known to engineers and skilled artisans who have for a long time been acquainted with the objections of the present forms and constructions of flow meters, that they are made up of a large number of parts, with intricate mechanisms, making it difficult for the ordinary individual to understand the same. Recognizing these disadvantages, we have endeavored to simplify the construction so that our device is reduced to absolute simplicity; is capable of being operated by a very slight pressure of moving fluid, and will steadily and faithfully, as well as accurately, indicate the true rate of flow of the used fluid.

With these and other objects in view, the invention consists in the construction, combination and arrangement of parts as will be hereinafter fully described and illustrated in the accompanying drawings and pointed out in the claims hereto appended.

In the accompanying drawings which show the preferred embodiment of our invention and to which reference is herein had by the characters designating corresponding parts throughout the several views:—

Fig. 1 is a sectional view of our improved flow meter.

Fig. 2 is a side elevation of our improved flow meter with parts broken away showing the parts of the instrument in position before the inflow of fluid has caused the instrument to operate.

Fig. 3 is a detail view, partly in section, of the metering pin secured to the base of the chamber with its correlated parts.

The device consists of a casing A which is divided into chambers 1 and 2 respectively, chamber 1 composing the main body while chamber 2 is an auxiliary body, being formed as a metal bellows or sylphon type of diaphragm 3. A thin plate 4 is soldered to the base of the sylphon and a metering pin 5 projects upwardly into an orifice 6. Just above the point of the metering pin 5 and attached to the thin plate 4 by means of standards 7 is a turbine blade 8. The base of the blade 8 is formed into a vein type of cone 9 which is directly above the orifice 6 in the thin plate 4. A recording pin 10 is suitably attached to the turbine blade 8, while a circular spring 11 surrounds the recording pin 10 and contacts with a cover plate 12 of the casing A. A lever 13 is pivoted at 14 and records on an instrument board 15 over its calibrated surface 16 the rate of flow of the fluid when the recording pin 10 moves upwardly or downwardly through the medium of the mechanical parts and the type of diaphragm just described.

In order to bring out more thoroughly the operation of the invention, the purpose of the metering pin 5 with its vein type of cone 9 and its correlated parts will be more fully described. The provision of the blade 8 with a type of cone 9 is for a two-fold reason; first, it uses the liquid stream to help give a stream-flow reading, and second, but not less important, it straightens out the stream lines of the flowing liquid in such a manner as not to allow eddy currents to affect the true reading of the real flow of liquid passing through the orifice.

This device, while primarily intended as a flow meter, may be utilized as a viscosity meter by running liquid through at a given temperature and measuring it against a liquid of known temperature and viscosity. However, if the instrument is used as a viscosity meter, it will be necessary for the scale under the pointer to be graduated to read "Viscosity" instead of "Flow," which would be the only change to differentiate the flow meter from a viscosity meter.

Furthermore, it may be noted that by putting known flows through the flow meter and having a calibrated dial made up and placed under the hand, the instrument will then become an independent machine or device capable of showing from a slight flow up to the capacity of a device, indicating at all times the amount of liquid passing through it and showing the slightest variations in flow.

The operation of the device may best be described as follows: A suitable recording mechanism, as 15, is attached to the flow meter so as to record the movement of the diaphragm 3. Now, when there is no flow, the metering pin 5 will entirely close the orifice 6, and this would be a zero or no-flow position of the indicating lever 13, as shown to advantage in Fig. 2. When a flow is allowed, there is a pressure difference set up on the diaphragm, causing the diaphragm 3 to move away from the metering pin 5 a distance which will allow the opening of the orifice 6 around the metering pin to be sufficiently large to allow that amount of flow through. This amount of flow will require an increase or decrease in the size of the orifice, according to the size of the flow stream. This action will in turn move the diaphragm away from or toward the metering pin 5, and as the diaphragm movement is recorded by the indicating lever 13 the change of flow is accordingly shown.

From the foregoing description, taken in connection with the drawings, it will be seen that our invention provides a flow-meter of the character set forth which is simple in construction and designed to carry out the objects of the invention in a reliable and efficient manner. It will, of course, be understood that while the construction disclosed is preferred, changes for and within the scope of the appended claims may be made without departing from the spirit or sacrificing any of the advantages of the invention.

What is claimed as new is:

1. A device for indicating the flow of a fluid, comprising a main casing having inlet and outlet passages therein, an auxiliary chamber in the main casing and expansible under pressure, a thin plate having an orifice therein forming the base of said chamber, a diaphragm suspended from said casing and connected to said thin plate and forming the side walls of said chamber, a centrally located metering pin closing the orifice of the thin plate when the flow is zero to control the flow of the liquid, and indicating means for measuring the rate of flow of said fluid.

2. A device for indicating the flow of a fluid, comprising a main casing having inlet and outlet passages therein, a diaphragm suspended from said casing, a thin plate attached to said diaphragm, said diaphragm and thin plate forming the side walls and base of an auxiliary chamber expansible under pressure, said thin plate having an orifice therein to allow the passage of fluid from the inlet to the outlet passage of said casing, a turbine blade mounted on said thin plate, standards to support said blade, a metering pin normally closing the orifice of the thin plate to control the flow of the fluid, and means for indicating the rate of flow of the fluid.

3. A device for indicating the flow of a fluid, comprising a main casing having inlet and outlet passages therein, an auxiliary chamber in said casing expansible under pressure, a thin plate having an orifice therein suspended from said casing and forming the base of said auxiliary chamber, a diaphragm connecting said plate and said casing and forming the walls of said auxiliary chamber, a turbine blade formed into a cone-shaped vein on its lower side and mounted on said thin plate, said turbine blade spreading and deflecting the flow of fluid passing through the orifice of the thin plate, a tapered metering pin controlling the flow of said fluid, and indicating means for measuring the rate of flow of said fluid from the inlet to the outlet passages of said casing.

4. A device for indicating the flow of a fluid, comprising a main casing having inlet and outlet passages therein, a thin plate having an orifice therein and suspended from said casing, a diaphragm connecting said plate and said casing, a metering pin having a guideway therein centrally mounted on the bottom wall of said casing, a turbine blade formed on one side into a cone-shaped vein and terminating in a guide stem, said blade riding in the guide-way of said metering pin and disposed above the orifice of the thin plate to spread and deflect the flow of fluid passing through the orifice, and indicating means cooperating with said blade and plate to measure the rate of flow of fluid from the inlet passage to the outlet passage of said casing.

5. A device for indicating the flow of a fluid, comprising a main casing having inlet and outlet passages therein, a thin plate suspended from said casing and having an orifice therein, a diaphragm connecting said plate and said casing, said thin plate and diaphragm forming an auxiliary chamber expansible under pressure, a metering pin centrally located on the bottom wall of said casing, said metering pin having a guideway therein, and a turbine blade terminating in a guide stem, a circular spring mounted on said turbine blade to force said thin plate against said metering pin, and indicating means cooperating with said blade and said plate to measure the rate of flow of fluid from the inlet to the outlet passages of said casing.

6. A device for indicating the flow of a fluid, comprising a main casing having inlet and outlet passages therein, a thin plate suspended from said casing and having an orifice therein, a diaphragm connecting said plate and said casing, said diaphragm and thin plate forming an auxiliary chamber expansible under pressure, a metering pin centrally located in the bottom wall of said casing, said metering pin having a guideway therein, a turbine blade terminating in a guide stem, a circular spring mounted on said turbine blade to force said thin plate against said metering pin to cause a no-flow reading, an indicating pin mounted on said blade, a pivoted lever mounted on top of said casing and movable by the action of said indicating pin, and a calibrated instrument board associated with the pivoted lever, for the purpose specified.

7. In combination with a casing for a flow meter device, a collapsible auxiliary chamber within said casing, valve means controlling the inlet of fluid to said auxiliary chamber from within said casing, one element of said valve means fixedly mounted on said casing, and the remaining portion of said valve means mounted on said collapsible chamber, and an indicating device operated by the collapsible motion of said auxiliary chamber and its valve portion.

8. In combination with a casing for a flow meter device, a spring tensioned collapsible auxiliary chamber within said casing, valve means controlling the inlet of fluid to said auxiliary chamber from within said casing, one element of said valve means fixedly mounted on said casing, and the remaining portion of said valve means mounted on said collapsible chamber, and an indicating device operated by the collapsible motion of said auxiliary chamber and its valve portion.

In testimony whereof we affix our signatures.

ALBERT R. LONG.
H. H. TURNER.